US012038545B1

(12) United States Patent
Wang et al.

(10) Patent No.: US 12,038,545 B1
(45) Date of Patent: Jul. 16, 2024

(54) FREELY-COMBINABLE MULTIFUNCTIONAL OCEAN-BOTTOM SEISMIC DETECTION DEVICE

(71) Applicant: Institute of Geology and Geophysics, Chinese Academy of Sciences, Beijing (CN)

(72) Inventors: Yuan Wang, Beijing (CN); Chunlei Zhao, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/599,172

(22) Filed: Mar. 7, 2024

(30) Foreign Application Priority Data

May 30, 2023 (CN) .......................... 202310625361.4

(51) Int. Cl.
*G01V 1/18* (2006.01)
*G01V 1/16* (2006.01)
*G01V 1/38* (2006.01)

(52) U.S. Cl.
CPC .............. *G01V 1/162* (2013.01); *G01V 1/186* (2013.01); *G01V 1/3835* (2013.01); *G01V 2210/1427* (2013.01)

(58) Field of Classification Search
CPC ...... G01V 1/162; G01V 1/186; G01V 1/3835; G01V 2210/1427
See application file for complete search history.

(56) References Cited

U.S. PATENT DOCUMENTS

2012/0294123 A1* 11/2012 You .......................... G01V 1/18
367/188
2014/0315451 A1 10/2014 Hatakeyama et al.

FOREIGN PATENT DOCUMENTS

CN 102288989 A 12/2011
CN 102914798 A 2/2013
(Continued)

OTHER PUBLICATIONS

Nedimović, "Ocean Bottom Seismometer Instrumentation in Canada", CSEG Recorder, Mar. 2019 (Year: 2019).*
(Continued)

*Primary Examiner* — Krystine E Breier
(74) *Attorney, Agent, or Firm* — Bayramoglu Law Offices L.L.C

(57) ABSTRACT

A freely-combinable multifunctional ocean-bottom seismic detection device includes a cabin body having a sealed structure and is made of a titanium alloy. A hydrophone, a first power interface, and a signal transmission sealing connector are mounted on an upper flange. A digital collector, a broadband seismometer, a global positioning system (GPS), and an electronic compass are mounted in the cabin body. The broadband seismometer is mounted on a leveling mechanism. Rechargeable lithium batteries are mounted in sealed battery compartments. A settlement coupling frame is arranged below the cabin body and is detachably connected to the cabin body. An uncoupling mechanism is mounted at a top of the cabin body. The device has a synchronous arrangement function of deployment as an independent node with data stored inside the instrument, and quick integration into a seabed foundation (or a subsurface buoy) with real-time data transmission.

5 Claims, 4 Drawing Sheets

(56) References Cited

FOREIGN PATENT DOCUMENTS

| | | |
|---|---|---|
| CN | 105068132 A | 11/2015 |
| CN | 106886048 A | 6/2017 |

OTHER PUBLICATIONS

You Qing-Yu, et al., High frequency micro-power ocean bottom aeismograph, Progress in Geophysics, 2003, pp. 173-176, vol. 18 No. 1.

* cited by examiner

FREELY-COMBINABLE MULTIFUNCTIONAL OCEAN-BOTTOM SEISMIC DETECTION DEVICE

CROSS REFERENCE TO THE RELATED APPLICATIONS

This application is based upon and claims priority to Chinese Patent Application No. 202310625361.4, filed on May 30, 2023, the entire contents of which are incorporated herein by reference.

TECHNICAL FIELD

The present disclosure relates to the technical field of marine seismic observation, and in particular, to a freely-combinable multifunctional ocean-bottom seismic detection device.

BACKGROUND

Tsunami is one of major disasters faced by human beings, and 81% of global tsunamis are caused by earthquakes. Using the differential characteristics that seismic waves travel approximately 20 times faster than tsunami waves, tsunami early warning is achieved by observing submarine earthquakes in advance, and real-time observation of submarine earthquakes is the only condition for early warning of submarine earthquakes and tsunamis.

Because of the special detection requirement that ocean-bottom seismic observation needs an instrument to record seismic signals directly coupled to ocean-bottom sediments, an ocean bottom cable (OBC) seismic detection apparatus, an ocean bottom seismometer, a combined ocean bottom seismometer (or an ocean bottom node (OBN)), and other apparatuses have been developed successively to record seismic signals by directly sinking to be coupled to ocean-bottom sediments. The three apparatuses each have their own technical advantages and disadvantages. The OBC seismic detection apparatus can implement real-time data acquisition, but cannot be equipped with a broadband seismometer, and is limited to shallow sea active source seismic exploration because of construction particularity. Although the ocean bottom seismometer breaks through the limitation in arrangement seawater depth and can be independently deployed and recovered as a single node, the ocean bottom seismometer does not have functions of real-time data transmission and quick battery swap when deployed again. The combined ocean bottom seismometer can be independently deployed, but because of the absence of an acoustic release device, the combined ocean bottom seismometer depends on a cable or a robot for arrangement, and is limited in operating water depth, so that it is impossible to transmit data in real time and swap a battery quickly.

With the diversification of seismic exploration tasks, complexity of exploration objects, and diversification of application scenarios, it is highly desirable to develop a device that has a synchronous arrangement function of deployment as an independent node and quick integration into a seabed foundation (or a subsurface buoy), and the like, a function of deployment after long-term charging and quick battery swap in field operation, and a function of independent acquisition of self-stored data and independent acquisition of data transmitted in real time.

SUMMARY

An objective of the present disclosure is to provide a freely-combinable multifunctional ocean-bottom seismic detection device to solve the above problems existing in the prior art, which has a synchronous arrangement function of deployment as an independent node and quick integration into a seabed foundation (or a subsurface buoy), and the like, a function of deployment after long-term charging and quick battery swap in field operation, and a function of independent acquisition of self-stored data and independent acquisition of data transmitted in real time.

To achieve the above objective, the present disclosure provides the following solution:

The present disclosure provides a freely-combinable multifunctional ocean-bottom seismic detection device, including a cabin body, a leveling mechanism, a control circuit board, an underwater acoustic release circuit board, a plurality of sealed battery compartments, a plurality of floating body materials, a settlement coupling frame, and an uncoupling mechanism, where the cabin body has a sealed structure and includes an upper flange and a lower flange, where the upper flange is fixedly arranged at a top of the cabin body, the lower flange is fixedly arranged at a bottom of the cabin body, the cabin body is made of a titanium alloy, and the cabin body is formed through machining by a rolling forming process after forging and punching; a hydrophone, a first power interface, and a signal transmission sealing connector are mounted on the upper flange; a digital collector, a broadband seismometer, a network communication module, a global positioning system (GPS), and an electronic compass are mounted in the cabin body; the leveling mechanism is arranged in the cabin body and is fixed to the lower flange at the bottom of the cabin body by a leveling support, and the broadband seismometer is mounted on the leveling mechanism; the control circuit board and the underwater acoustic release circuit board are fixed to the leveling support; rechargeable lithium batteries are mounted in the sealed battery compartments, a top of each of the sealed battery compartments is detachably and fixedly connected to the upper flange, a bottom of each of the sealed battery compartments is detachably and fixedly connected to the lower flange, the sealed battery compartments are arranged on an outer side of the cabin body along a circumferential direction of the cabin body, the top of each of the sealed battery compartments is provided with a second power interface, and the second power interface is configured to be electrically connected to the first power interface; a top of each of the floating body materials is detachably and fixedly connected to the upper flange, a bottom of each of the floating body materials is detachably and fixedly connected to the lower flange, and the floating body materials are arranged on the outer side of the cabin body along the circumferential direction of the cabin body; the settlement coupling frame is arranged below the cabin body and is detachably connected to the cabin body; and the uncoupling mechanism is mounted at the top of the cabin body.

Preferably, the upper flange and the lower flange press an O-ring by screws to seal the cabin body.

Preferably, the broadband seismometer is designed by adding a self-developed spread spectrum circuit on a radio-detector.

Preferably, the upper flange is a fan structure and is provided with a plurality of mounting holes and a plurality of positioning grooves, and the mounting holes and the positioning grooves can match various mounting supports by mechanical fixation.

Preferably, the uncoupling mechanism includes a fuse, an underwater acoustic transducer, and four tensioning steel cables, where one tensioning steel cable is configured to connect one corner of the settlement coupling frame to the cabin body, the underwater acoustic transducer can use a sonar apparatus to generate a voltage to electrically corrode the fuse, and when the fuse is disconnected, the four tensioning steel cables fall to separate the settlement coupling frame from the cabin body.

Compared with the prior art, the present disclosure has the following technical effects:

The present disclosure provides a freely-combinable multifunctional ocean-bottom seismic detection device, which has a function of data self-acquisition, self-storage, and real-time transmission, a function of quick plug-in battery swap, a function of independent acoustic release or release and recovery by being carried to another platform, and a function of arbitrary configuration of a high-frequency seismometer and a broadband seismometer. To sum up, the seismic observation device has multiple functions including self-storage or real-time transmission, quick battery swap, independent deployment or integration. In addition, a plurality of components of the entire device have the characteristics of high freedom of combination externally, with no need to open or change the shape of a component or change a component interface. An ocean-bottom seismic acquisition cabin body can be directly and freely combined with an ocean-bottom subsurface buoy system with a transmission function by means of a connector, and power supply and communication functions are achieved by means of the connector. Battery compartments can be replaced, increased or decreased according to seismic detection requirements to achieve an optimal combination. A broadband seismometer or a high-frequency seismometer may be arbitrarily selected and assembled inside the acquisition cabin body according to requirements of a detection seismic frequency band range, with no need to change a main structure and an interface of the cabin body.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

In the figures: 1. Signal transmission sealing connector; 2. Floating body material fixing hole; 3. First power interface; 4. Upper flange; 5. Hydrophone; 6. cabin body; 7. Lower flange; 8. Mounting fixing hole; 9. Rechargeable lithium battery; 11. Second power interface; 12. Battery compartment sealing cover; 13. Battery compartment floating body material; 14. Sealed battery compartment; 15. Floating body material; 16. Settlement coupling frame; 17. Fuse; 18. Polar plate; 19. Supporting base; 20. Uncoupling rotating shaft; 21. Underwater acoustic transducer; 22. Decoupler support; 23. Tensioning steel cable; 24. Underwater acoustic release circuit board; 25. Control circuit board; 26. Broadband seismometer; 27. Leveling mechanism; 28. Leveling support.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a freely-combinable multifunctional ocean-bottom seismic detection device to solve the above problems existing in the prior art, which has a synchronous arrangement function of deployment as an independent node and quick integration into a seabed foundation (or a subsurface buoy), and the like, a function of deployment after long-term charging and quick battery swap in field operation, and a function of independent acquisition of self-stored data and independent acquisition of data transmitted in real time.

In order to make the above objective, features and advantages of the present disclosure clearer and more comprehensible, the present disclosure will be further described in detail below in combination with accompanying drawings and specific implementations.

Figure 1:
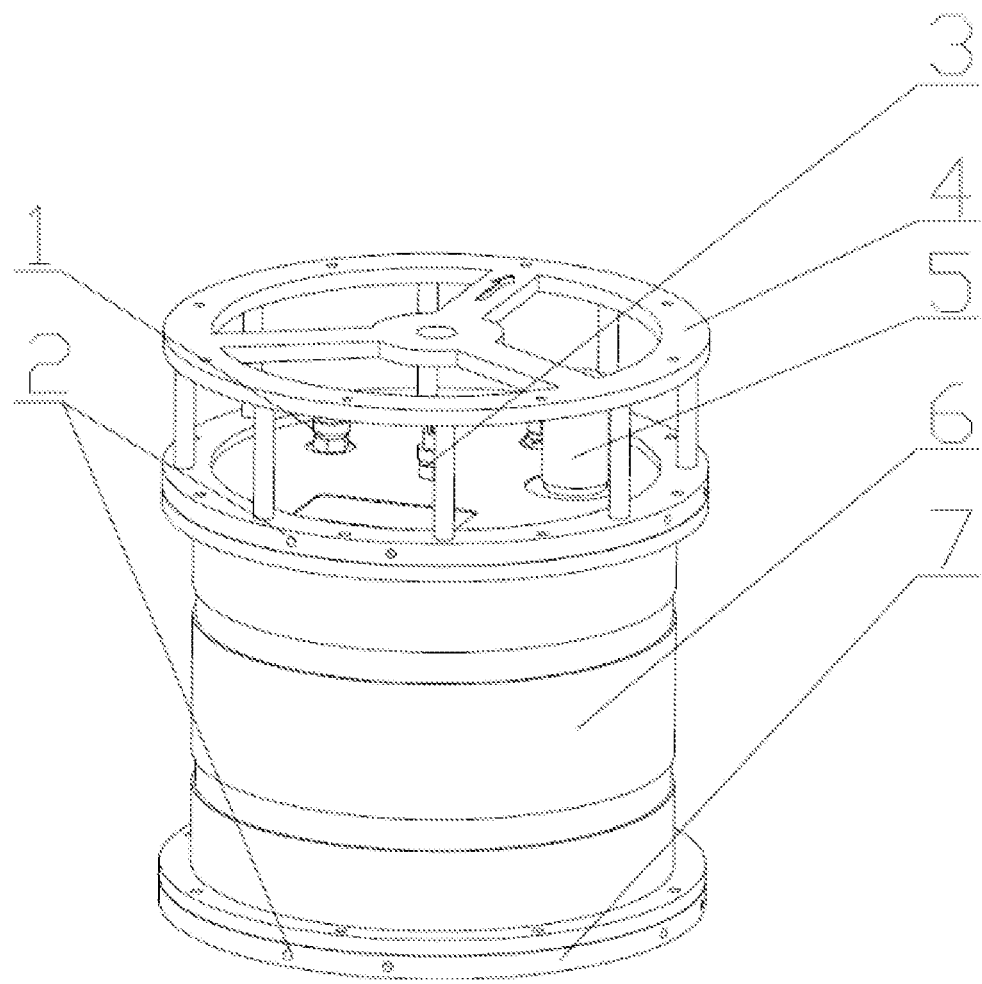
FIG. 1 is an overall schematic diagram of a cabin body of a freely-combinable multifunctional ocean-bottom seismic detection device according to the present disclosure.
Figure 2:
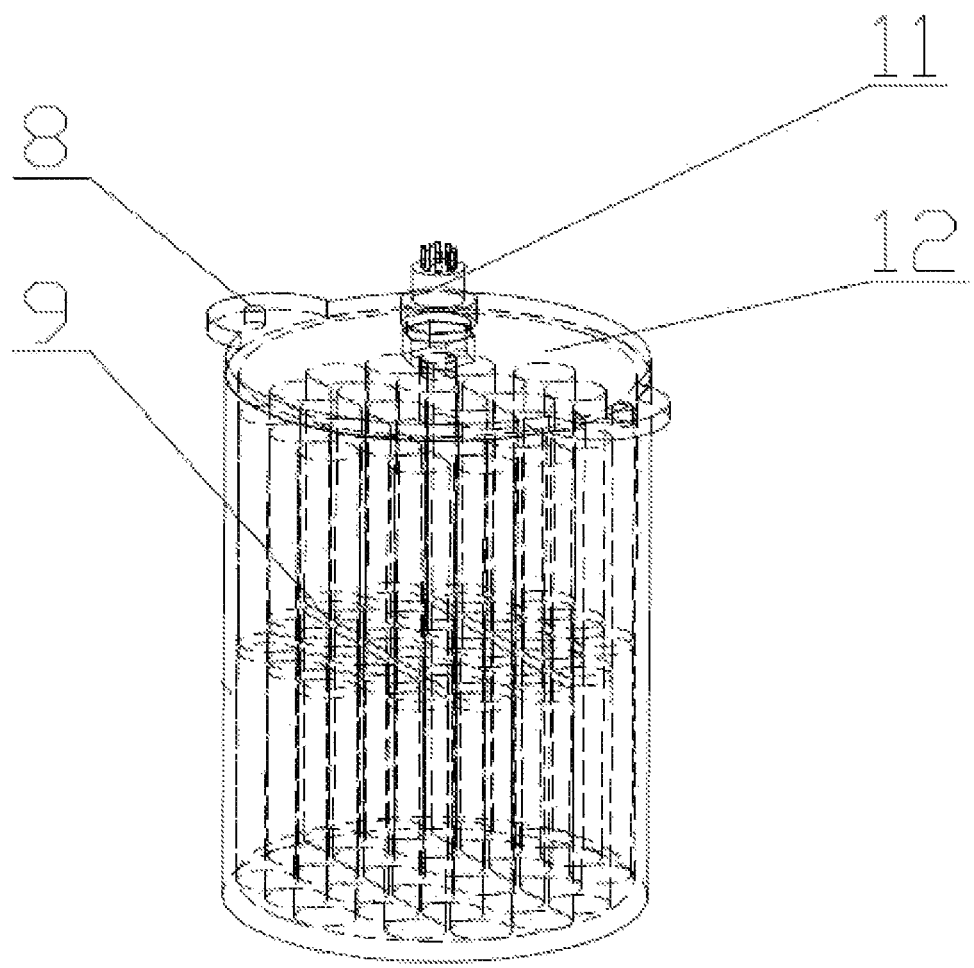
FIG. 2 is a schematic structural diagram of external sealed battery compartments of a freely-combinable multifunctional ocean-bottom seismic detection device according to the present disclosure.
Figure 3:
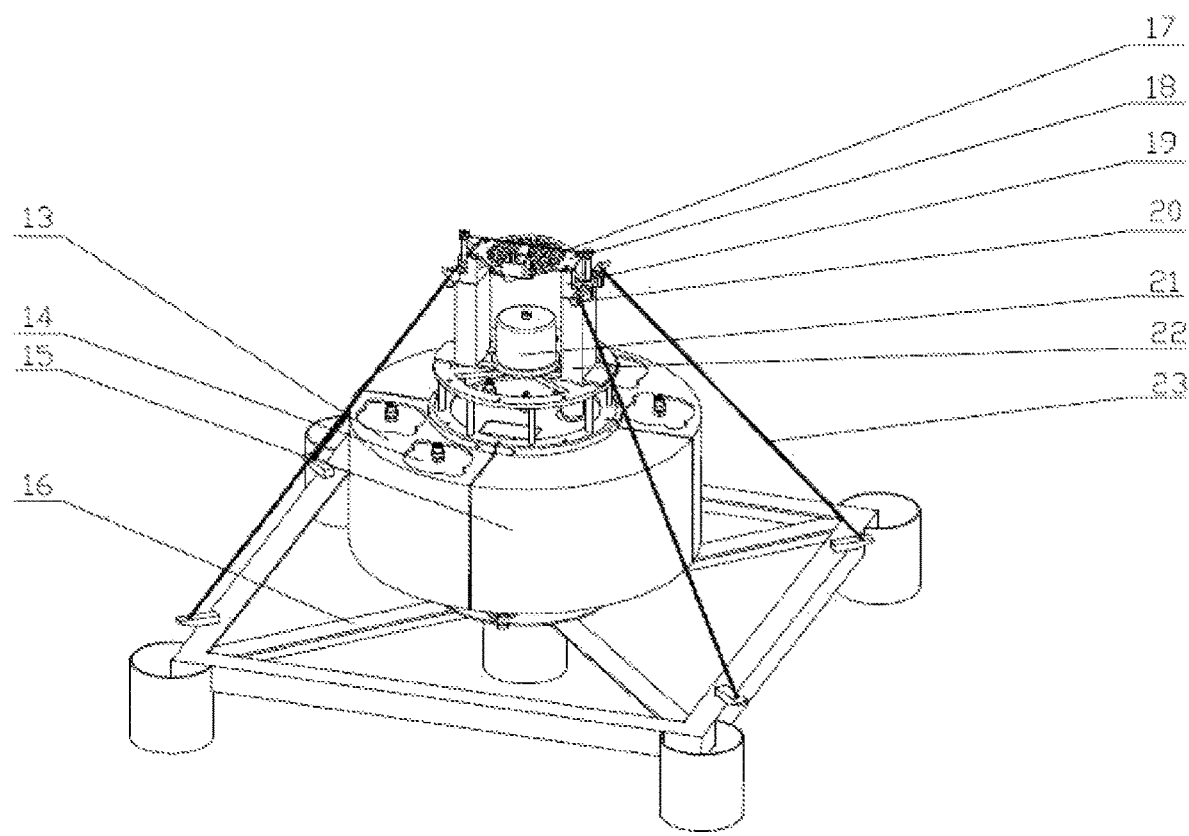
FIG. 3 is a schematic diagram of a self-sinking-floating appearance structure of a freely-combinable multifunctional ocean-bottom seismic detection device according to the present disclosure.
Figure 4:
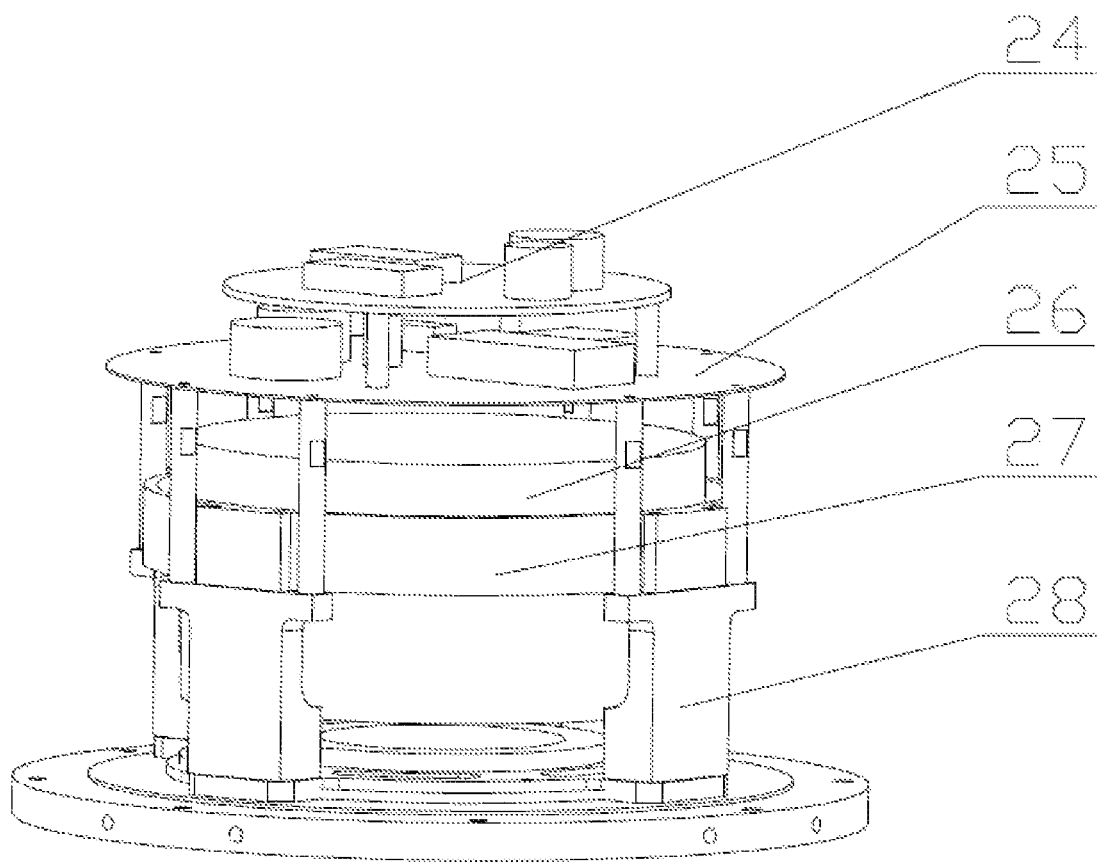
FIG. 4 is a schematic diagram of an internal structure of a cabin body of a freely-combinable multifunctional ocean-bottom seismic detection device according to the present disclosure.

The present disclosure provides a freely-combinable multifunctional ocean-bottom seismic detection device. As shown in FIGS. 1 to 4, when the device is used as an ocean bottom seismometer for real-time transmission, an external structure thereof includes cabin body 6, upper flange 4, and lower flange 7. The cabin body 6 is externally powered metal cabin body 6, and features small volume, low power consumption, convenient operation, and the like. A titanium alloy shell is used for the cabin body 6, and is resistant to corrosion and collision. When deployed, the freely-combinable multifunctional ocean-bottom seismic detection device is placed in a fixing frame, and is placed at a pre-selected position at an ocean bottom. By means of signal transmission sealing connector 1 and an external power interface, power supply and real-time data transmission for each instrument in the cabin body 6 are achieved. Leveling mechanism 27 is internally mounted to level a posture of broadband seismometer 26. The leveling mechanism 27 is arranged in the cabin body, and is fixed to the lower flange at a bottom of the cabin body 6 by leveling support 28. The broadband seismometer is mounted on the leveling mechanism 27.

The design of the cabin body 6 meets technical requirements of strong coupling and weak noise interference in ocean-bottom seismic detection. The cabin body 6 is machined by a rolling forming process after forging and punching. After heating and forging, the structure and mechanical properties of the cabin body can be improved. The cabin body has the advantages of low material and energy consumption, low comprehensive cost, and high impact resistance, thus ensuring economy of batch production and application of the cabin body 6. Fitting mounting holes with different functions are reserved at a top of the cabin body 6, to mount hydrophone 5, a sealing connector, an observation hole, and the like, all of which need to meet a compressive strength at a water depth of 1000 m.

The real-time transmission ocean-bottom seismic detection device with the metal cabin body 6 is a sealed titanium alloy metal cabin as a whole. For sealing, only a display hole of an indicator light is reserved externally, and the indicator light is configured to display an instrument state. A common anode tri-color light-emitting diode (LED) light is used in design to indicate various states. A red light is a pulse per second (PPS) indicator light, a green light is a secure digital (SD) card writing light, and a blue light is a state switching indicator light.

The upper flange 4 is designed with a fan structure that is easy to assemble and carry, which can not only protect the connector and the hydrophone 5, but also be easily connected to another structure, and facilitate carrying. Such a structure does not affect the uniform layout of a whole interior, and reduces the difficulty of offshore construction.

The cabin body 6 is fixed to the internal integrated structure by means of fixing threaded holes in the lower flange 7. The internal integrated assembly includes a digital collector, a full-angle radiodetector, a network communication module, a GPS, and an electronic compass. The seismometer is designed by adding a self-developed spread spectrum circuit to the radiodetector, which is compatible with the broadband seismometer 26 and a high-frequency seismometer.

A number of external sealed battery compartments 14 can be freely selected in advance according to a difference in observation duration requirements for an instrument remaining in the sea. In addition, for the device that has been prepared, external sealed battery compartments 14 with the same configuration parameters may be provided. The cabin body is provided with first power interface 3, and each sealed battery compartment 14 is provided with second power interface 11. The first power interface 3 is connected to the second power interface 11 based on a direct plug-in manner, thereby implementing quick battery swap for an instrument during field operations. Rechargeable lithium battery 9 is placed in the sealed battery compartment 14, and battery compartment sealing cover 12 of the sealed battery compartment 14 performs sealing by pressing an O-ring. The sealed battery compartment 14 is fixed in battery compartment floating body material 13. Floating body material 15 and the battery compartment floating body material 13 are mounted around the cabin body 6, and are fixed by two screws at each of a top and a bottom. The sealed battery compartment 14 is provided with mounting fixing hole 8, and the upper flange of the cabin body 6 is provided with floating body material fixing hole 2.

Underwater acoustic transducer 21 and an uncoupling mechanism are fixed to the top of the cabin body 6 by screws. The uncoupling mechanism includes fuse 17, polar plate 18, supporting base 19, uncoupling rotating shaft 20, underwater acoustic transducer 21, decoupler support 22, and tensioning steel cables 23. Four tensioning steel cables 23 are tensioned to fix the entire instrument to settlement coupling frame 16. After the instrument is recovered, a sonar apparatus is used to call the underwater acoustic transducer 21 of the instrument, and an instrument release system provides a voltage to the outside. After the fuse 17 is disconnected by electrical corrosion, the four tensioning steel cables 23 that connect the cabin body 6 to the settlement coupling frame fall, and then the instrument floats autonomously by buoyancy of a buoyancy body material. The instrument release system includes underwater acoustic release circuit board 24 and control circuit board 25.

A mature scheme of data acquisition by a sinking-floating ocean bottom seismometer is used for an electronic circuit and a software architecture. A software and hardware scheme is to transplant an original mature ocean-bottom seismic acquisition system based on an ARM7 core single-chip microcomputer to a Cortex-M3 core single-chip microcomputer system with higher performance and lower power consumption. This scheme can fully inherit previous research results, shorten a development cycle, and reduce a development risk and development costs. In addition, the performance of the instrument has been upgraded to ensure the advanced nature of equipment.

Compared with a conventional single-cabin body-ball ocean bottom seismometer, the freely-combinable multifunctional ocean-bottom seismic detection device has the advantages that the device can be carried to any other ocean-bottom detection platform (such as an ocean-bottom subsurface buoy, an ocean-bottom lander, and an ocean-bottom junction box), or be self-contained after being equipped with a buoyancy body material and a releaser, and support real-time data transmission. According to different ocean-bottom test areas and requirements, a self-sinking-floating or real-time transmission operation mode is flexibly selected, and an independent ocean bottom seismometer can be formed by mounting a buoyancy body material and a release apparatus. Field deployment and recovery operations are implemented in the self-sinking-floating operation mode. Through mounting and integration with a detection platform such as an ocean-bottom junction box, the real-time transmission operation mode can be implemented after direct connection to the platform by means of a connector, to collect ocean-bottom vibration data in real time. The two operation modes feature simple installation and easy operation. This device can be freely switched between the two modes without additional modification.

A dynamic use process is as follows.

Carrying type real-time ocean-bottom seismic detection mode: When used as a real-time transmission broadband ocean bottom seismometer, a freely-combinable multifunctional ocean-bottom seismic detection device is fixed to a support of a carrying platform before entering a sea. By using a multifunctional box for clock alignment, each instrument automatically aligns with GPS signals to enter an acquisition mode. Then, deployment locations and orientations are selected, and the instruments are deployed at the locations. Data is observed and recorded in real time for analysis and research.

Independent node type self-storage ocean bottom seismic detection mode: When a freely-combinable multifunctional ocean-bottom seismic detection device is used as a sinking-floating broadband ocean bottom seismometer, floating body material 15 and sealed battery compartments 14 are fixed around cabin body 6, and an uncoupling mechanism is mounted at a top. Four tensioning steel cables 23 are used to pull and fix the cabin body 6 to settlement coupling frame 16. Then, by means of an external GPS second pulse signal provided by the multifunctional box, an internal clock of an instrument is calibrated to achieve clock alignment. After the clock alignment of the instrument is completed, the instrument automatically enters an acquisition mode. A crane lifts the entire machine and deploys the machine to a designated operating point in the sea, allowing the machine to freely fall and sink to the ocean bottom. When the instrument is recovered, a sonar apparatus is used to call underwater acoustic transducer 21 of the instrument, and an instrument release system provides a voltage to the outside. After a steel wire fuses by electrical corrosion, the four tensioning steel cables 23 that connect the instrument to the settlement coupling frame fall, and then the instrument floats autonomously by buoyancy of a buoyancy body material.

Specific examples are used for illustration of the principles and implementations of the present disclosure. The description of the above embodiments is merely used to help understand the method and its core ideas of the present disclosure. In addition, those of ordinary skill in the art can make modifications in terms of specific implementations and scope of use according to the ideas of the present disclosure. In conclusion, the content of this description shall not be construed as limitations to the present disclosure.

What is claimed is:

1. A freely-combinable multifunctional ocean-bottom seismic detection device, comprising:
    a cabin body, wherein the cabin body has a sealed structure and comprises an upper flange and a lower flange, the upper flange is fixedly arranged at a top of the cabin body, the lower flange is fixedly arranged at a bottom of the cabin body, the cabin body is made of a titanium alloy, and the cabin body is formed through machining by a rolling forming process after forging and punching; a hydrophone, a first power interface, and a signal transmission sealing connector are mounted on the upper flange; a digital collector, a broadband seismometer, a network communication module, a global positioning system (GPS), and an electronic compass are mounted in the cabin body;
    a leveling mechanism, wherein the leveling mechanism is arranged in the cabin body and fixed to the lower flange at the bottom of the cabin body by a leveling support, and the broadband seismometer is mounted on the leveling mechanism;
    a control circuit board and an underwater acoustic release circuit board, wherein the control circuit board and the underwater acoustic release circuit board are fixed to the leveling support;
    a plurality of sealed battery compartments, wherein rechargeable lithium batteries are mounted in the sealed battery compartments, a top of each of the sealed battery compartments is detachably and fixedly connected to the upper flange, a bottom of each of the sealed battery compartments is detachably and fixedly connected to the lower flange, the sealed battery compartments are arranged on an outer side of the cabin body along a circumferential direction of the cabin body, the top of each of the sealed battery compartments is provided with a second power interface, and the second power interface is configured to be electrically connected to the first power interface;
    a plurality of floating body materials, wherein a top of each of the floating body materials is detachably and fixedly connected to the upper flange, a bottom of each of the floating body materials is detachably and fixedly connected to the lower flange, and the floating body materials are arranged on the outer side of the cabin body along the circumferential direction of the cabin body;
    a settlement coupling frame, wherein the settlement coupling frame is arranged below the cabin body and detachably connected to the cabin body; and
    an uncoupling mechanism, wherein the uncoupling mechanism is mounted at the top of the cabin body.

2. The freely-combinable multifunctional ocean-bottom seismic detection device according to claim 1, wherein the upper flange and the lower flange press an O-ring by screws to seal the cabin body.

3. The freely-combinable multifunctional ocean-bottom seismic detection device according to claim 1, wherein the broadband seismometer is designed by adding a self-developed spread spectrum circuit on a radiodetector.

4. The freely-combinable multifunctional ocean-bottom seismic detection device according to claim 1, wherein the upper flange is a fan structure and is provided with a plurality of mounting holes and a plurality of positioning grooves, and the mounting holes and the positioning grooves are configured to match various mounting supports by mechanical fixation.

5. The freely-combinable multifunctional ocean-bottom seismic detection device according to claim 1, wherein the uncoupling mechanism comprises a fuse, an underwater acoustic transducer, and four tensioning steel cables, wherein one tensioning steel cable is configured to connect one corner of the settlement coupling frame to the cabin body, the underwater acoustic transducer is configured to use a sonar apparatus to generate a voltage to electrically corrode the fuse, and when the fuse is disconnected, the four tensioning steel cables fall to separate the settlement coupling frame from the cabin body.

* * * * *